United States Patent
Wright (10) Patent No.: US 6,750,575 B2
(45) Date of Patent: Jun. 15, 2004

(54) METHOD AND APPARATUS FOR SENSING THE ANGULAR POSITION OF A ROTATING MEMBER

(75) Inventor: Kamron Wright, Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 224 days.

(21) Appl. No.: 10/063,451

(22) Filed: Apr. 24, 2002

(65) Prior Publication Data

US 2003/0038551 A1 Feb. 27, 2003

Related U.S. Application Data

(63) Continuation-in-part of application No. 09/682,326, filed on Aug. 21, 2001, now abandoned.

(51) Int. Cl.$^7$ .......................... H02K 71/00; H02K 7/00; H02K 3/00; H02K 19/26; H02K 3/46
(52) U.S. Cl. ............... 310/68 B; 310/179; 310/260; 310/194; 310/184
(58) Field of Search ................ 310/68 B, 179, 310/260, 194, DIG. 6, 192, 215, 214, 184, 187, 42

(56) References Cited

U.S. PATENT DOCUMENTS

| | | | |
|---|---|---|---|
| 3,673,584 A | 6/1972 | Farrand | 318/660 |
| 3,694,907 A * | 10/1972 | Margrain et al. | 29/598 |
| 4,100,444 A | 7/1978 | Boyd, Jr. | 310/200 |
| 4,164,705 A | 8/1979 | Whitney et al. | 310/68 D |
| 4,507,580 A | 3/1985 | Obara | 310/260 |
| 4,853,604 A * | 8/1989 | McMullin et al. | 318/653 |
| 5,099,162 A * | 3/1992 | Sawada | 505/166 |
| 5,304,886 A | 4/1994 | Yang | 310/268 |
| 5,313,128 A | 5/1994 | Robinson et al. | 174/117 A |
| 5,349,257 A | 9/1994 | Hernden | 310/156.7 |
| 5,418,416 A | 5/1995 | Müller | 310/68 B |
| 5,473,213 A | 12/1995 | Kahle, Sr. | 310/270 |
| 5,625,239 A * | 4/1997 | Persson et al. | 310/68 B |
| 5,646,464 A | 7/1997 | Sickafus | 310/40 MM |
| 5,796,194 A * | 8/1998 | Archer et al. | 310/68 B |
| 5,955,806 A * | 9/1999 | Devenyi | 310/156.26 |
| 5,986,419 A * | 11/1999 | Archer et al. | 318/254 |
| 6,066,905 A * | 5/2000 | Wright et al. | 310/179 |
| 6,111,329 A * | 8/2000 | Graham et al. | 310/42 |
| 6,175,169 B1 | 1/2001 | Hollis, Jr. et al. | 310/12 |
| 6,201,322 B1 | 3/2001 | Heine et al. | 310/51 |
| 6,568,065 B2 * | 5/2003 | Graham et al. | 29/596 |

* cited by examiner

Primary Examiner—Burton S. Mullins
Assistant Examiner—Julio Gonzalez
(74) Attorney, Agent, or Firm—Welsh & Katz, Ltd.

(57) ABSTRACT

A flexible quadrature coil circuit is provided for use in an electronically commutated dynamoelectric machine for sensing the angular rotational position of a rotor relative to a stator. The stator has a plurality of stator teeth, with each tooth having an inwardly facing arcuate surface with at least one elongated rib and a channel disposed along a vertical axis of the tooth. The flexible circuit includes a flexible electrically nonconductive substrate with at least one slot formed in the substrate. The slot is configured to receive the corresponding rib so as to releasably secure the substrate to the arcuate surface of the stator tooth. At least one continuous electrical conductor is embedded in the substrate in a serpentine manner so that the continuous conductor forms a plurality of spaced apart conductor portions disposed between selected slots. The conductor portions are vertically aligned with and are received into the channel of the stator tooth when the flexible substrate is secured to the arcuate surface of selected stator teeth.

14 Claims, 8 Drawing Sheets

METHOD AND APPARATUS FOR SENSING THE ANGULAR POSITION OF A ROTATING MEMBER

CROSS REFERENCE TO RELATED APPLICATIONS

This application is a continuation-in-part of and claims the benefit of priority from application Ser. No. 09/682,326 filed on Aug. 21, 2001, now abandoned having the same title.

BACKGROUND OF INVENTION

The present invention relates generally to a method and apparatus for sensing an angular position of a rotating member, and more particularly to a flexible quadrature coil circuit for use in an electric motor to facilitate sensing the angular position of a rotor.

Dynamoelectric machines, such as electric motors, are used in numerous applications, such as air compressors, refrigerators and a wide array of appliances. The ability to manufacture these motors at a low cost and operate them efficiently is an important aspect of their utility.

Electronic commutation permits efficient dynamoelectric machine operation. Electronic commutation controls the rotor by controlling the direction of the electrical current that induces rotor rotation. In order to maintain effective electronic commutation of the motor, it is important to accurately monitor the angular position of the rotor. Rotor position data is generally obtained by strategically placing sensors around the rotor inside the motor housing.

Some electric motor applications use Hall-effect position sensors to detect the angular position of the rotor. Typical Hall-effect position sensors for a single phase motor may require up to five wires, namely two leads for the motor, and three wires for the Hall-effect sensors. Because of its numerous connectors, Hall-effect sensors are difficult to add to a sealed motor system. Additionally, Hall-effect position sensors may be unreliable in some applications.

Quadrature coil sensors provide a low-cost alternative to the Hall-effect sensor for detecting the rotor angular position for commutation. Quadrature coil sensors provide accurate information, and can be added to a sealed motor system using a minimal number of wiring leads and connectors.

The use of quadrature coil windings to detect rotor angular position in electric motors is generally known. For example, U.S. Pat. Nos. 5,796,194 and 5,989,419 disclose the use of a quadrature axis winding for sensorless rotor angular position control of a single phase permanent magnet motor.

U.S. Pat. No. 5,796,194 discloses a quadrature axis winding for generating an output signal representative of rotor angular position. The quadrature axis winding is positioned out of phase from a main winding of the stator and is wound between the center notches of the stator teeth.

U.S. Pat. No. 5,986,419 discloses a quadrature axis winding wound between the center notch of two teeth of the stator. A pre-wound quadrature axis is first wound on a forming tool. The winding includes an insulated enamel wire covered with a plastic jacket. U.S. Pat. Nos. 5,764,194 and 5,986,419 are assigned to assignee of the present invention and are incorporated herein by reference in their entirety.

U.S. Pat. No. 5,313,128 to Robinson et al. discloses a flexible printed circuit including a plurality of electrical paths surrounded by a sheath of pliable MYLAR plastic. The flexible printed circuit is attached to a stator assembly with each winding wire wrapped around three separate poles. U.S. Pat. No. 5,313,128 is also incorporated herein by reference in its entirety.

Industrial standards for insulated lead wires used in electric motor windings require that ground insulation material pass an eighteen-month thermal aging test. Flexible laminated circuit technology, which uses plastic-type insulation material, eliminates the need for lead routing insulation, and complies with such industrial standards.

Accordingly, it is desirable to provide a laminated flexible quadrature coil sensor circuit for detecting the angular position of a rotor that is cost-effective to manufacture and simple to install or retrofit to a motor.

SUMMARY OF INVENTION

In accordance with one embodiment of the present invention, a flexible quadrature coil circuit is provided for use in an electronically commutated dynamoelectric machine for sensing the angular rotational position of a rotor relative to a stator. The stator has a plurality of stator teeth, with each tooth having an inwardly facing arcuate surface with at least one elongated rib and a channel disposed along a vertical axis of the tooth. The flexible circuit includes a flexible electrically nonconductive substrate with a plurality of slots formed in the substrate. The slots are configured to receive the corresponding elongated ribs so as to releasably secure the substrate to the arcuate surface of the stator tooth. At least one continuous electrical conductor is embedded in the substrate in a serpentine pattern so that the continuous conductor forms a plurality of spaced apart vertical conductor portions disposed between selected slots. The conductor portions are vertically aligned with and are received into the channel of the stator tooth when the flexible substrate is secured to the arcuate surface of selected stator teeth.

BRIEF DESCRIPTION OF DRAWINGS

The various objects and advantages of the present invention will become apparent to those of ordinary skill in the relevant art after reviewing the following detailed description and accompanying drawings, wherein.

DETAILED DESCRIPTION

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated.

Figure 1:
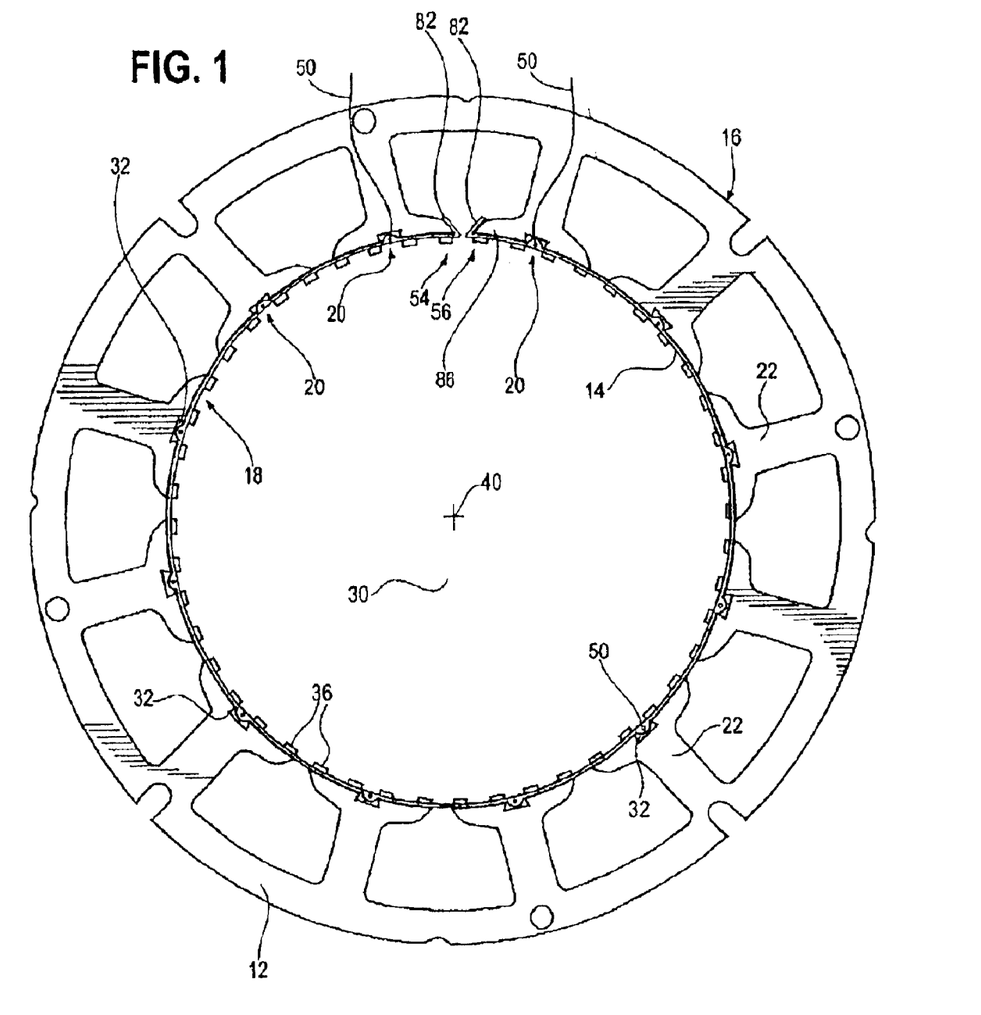
FIG. 1 is an end elevational view of a specific embodiment of a stator core having a flexible quadrature coil circuit shown operatively mounted within an inner circumference of the stator.

FIG. 1 illustrates a specific embodiment of a stator core 12 with a flexible quadrature coil circuit 14 operatively coupled within the stator core. The stator core 12 has a generally cylindrical configuration defined by an outer circumferential portion 16 and an inner circumferential portion 18.

The stator core 12 is formed with a plurality of adjacent poles 20. Each pole 20 terminates in a stator tooth 22 that extends radially inwardly from the outer circumferential portion 16 toward the inner circumferential portion 18. Preferably, the stator teeth 22 are arranged at regular angular intervals and preferably, an even number of such stator teeth exist. A rotor (not shown) rotates within the space 30 defined by the inner circumferential portion 18. A small air gap exists between the rotor and the stator teeth 22.

In the illustrated embodiment of FIG. 1, the stator core 12 is shown having twelve poles 20. However, the stator core 12 may have any suitable number of poles 20 without departing from the scope of the present invention. As more clearly shown in FIG. 2, each stator tooth 22 may preferably include at least one center channel 32 recessed into the stator tooth at a midpoint or centerline 34 (longitudinal axis) of the stator tooth. The channel 32 may be relatively shallow, as will be described hereinafter. Four elongated ribs 36 may protrude from an inner circumferential surface 38 of each stator tooth 22 toward the center of the stator core. The ribs 36 are generally parallel to the longitudinal axis 34 of the stator core 12, which longitudinal axis is parallel to a rotational axis 40 (FIG. 1) of the rotor. Of course, any suitable number of ribs 36 may be provided. For example, two to eight ribs 36 may be provided on each stator tooth 22. The stator teeth 22 and the ribs 36 establish the air gap between the stator 12 and the rotor.

Figure 3A:
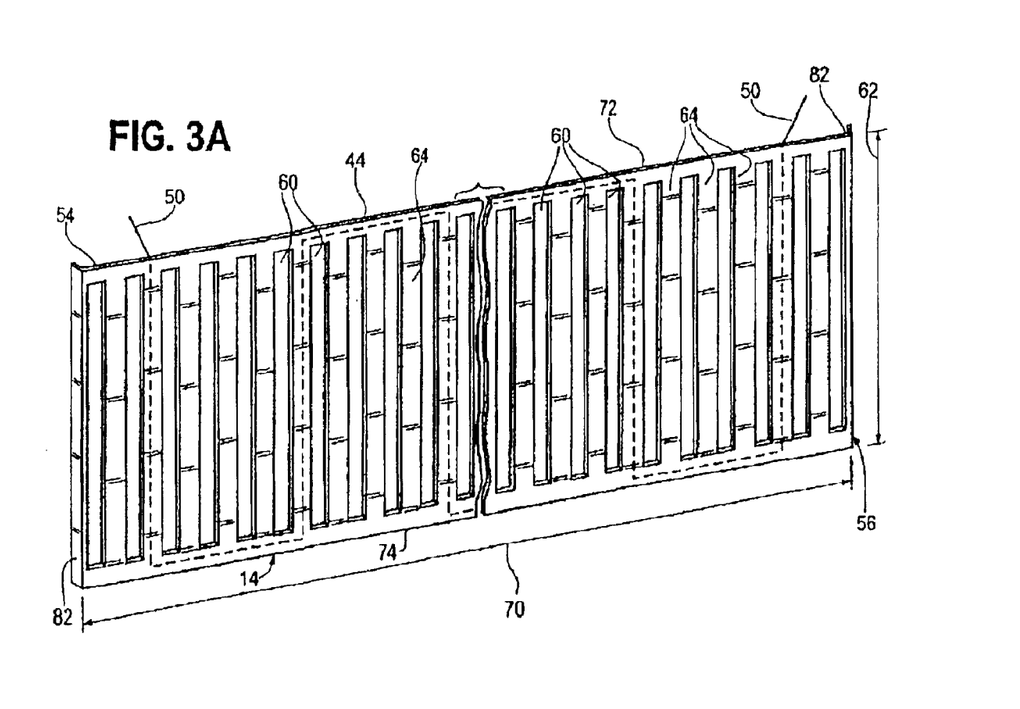
FIG. 3A is a perspective view of the flexible quadrature coil circuit of FIG. 1 shown in a flat configuration.
Figure 3B:
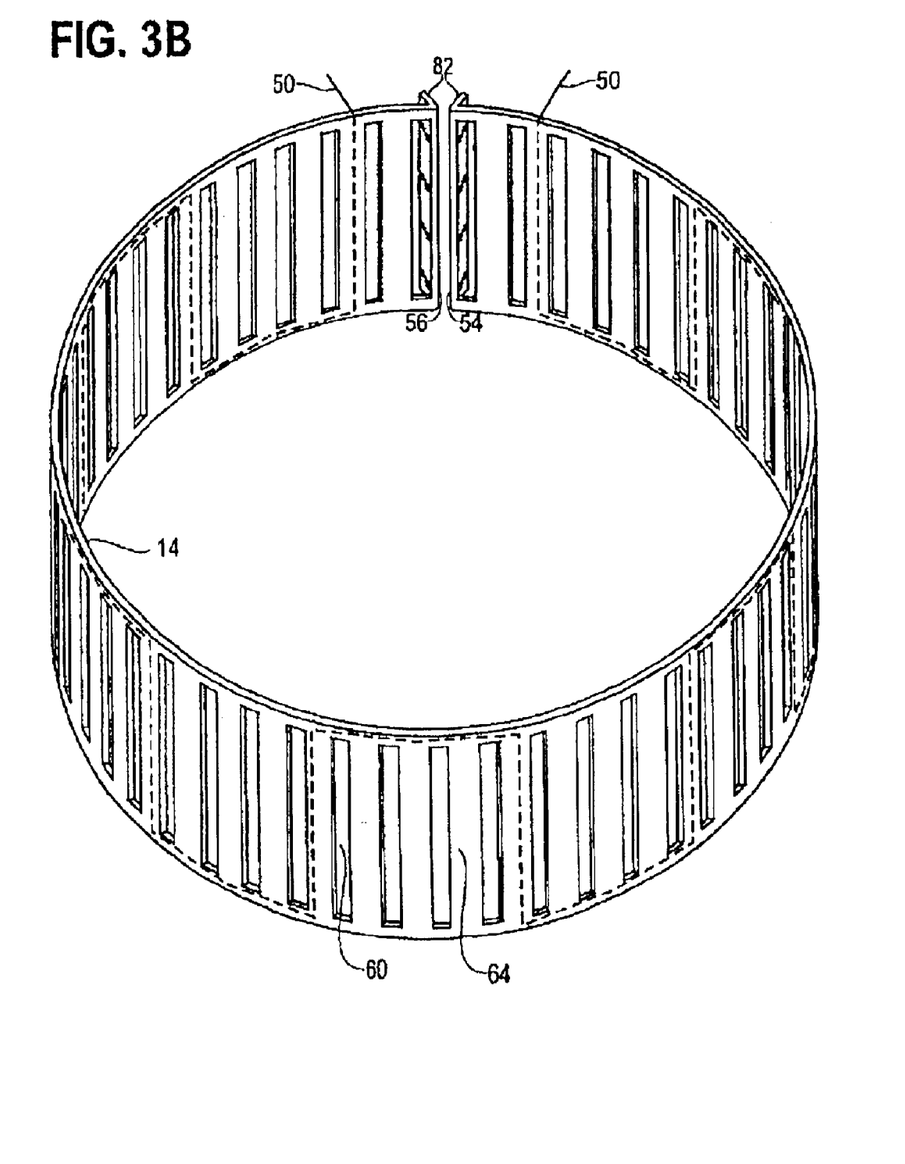
FIG. 3B is a perspective view of the flexible quadrature coil circuit of FIG. 1 shown as curled or bent prior to insertion into the stator core.

Referring now to FIGS. 3A and 3B, a specific embodiment of the flexible quadrature coil circuit 14 is shown. FIG. 3A shows the flexible circuit 14 in a flat configuration while FIG. 3B shows the flexible circuit curled or bent so as to fit within the inner circumferential portion 18 of the stator core 12. The flexible circuit 14 is formed as a flexible laminated substrate 44, which is generally planar and rectangular in shape. However, the substrate 44 may be formed in any suitable geometric shape. Preferably, the substrate 44 is made out of a flexible, electrically non-conductive material, such as MYLAR, plastic, and the like, and is preferably formed as two layers, which are bonded or laminated together using means known in the art. The flexible circuit 14 has a relatively thin, sheet-like cross-sectional thickness. Preferably, the flexible circuit 14 has a cross-sectional thickness between 5 mils and 7.5 mils. However, the flexible circuit 14 may have any suitable cross-sectional thickness, depending on the size of the motor, without departing from the scope of the present invention.

An electrical conductor or conducting wire 50 is embedded in the substrate 44 between the laminated layers, thus forming the flexible circuit 14. The electrical conductor 50 is shown in dashed lines. The conducting wire 50 travels within the substrate 44 in a serpentine or "square-wave" like manner. In the illustrated embodiment, the conducting wire 50 travels through the substrate 44 from a first end 54 of the flexible circuit 14 to a second end 56 of the substrate, essentially spanning a width 70 of the flexible circuit. The conducting wire 50 exits the substrate 44 near the first and second ends 54 and 56 to provide an electrical coupling to the electronic circuitry (not shown) that detects the rotational position of the rotor. Of course, the pattern of the conducting wire 50 is not limited to a square-wave configuration, and any suitable pattern may be used. The edges of the pattern need not be square and may be smooth or sinusoidal. Also note that the quadrature "coil" is essentially flat. That is, it does not coil about or fold upon itself, as does a conventional coil or winding. Rather, it is linear coil.

In operation, when the rotor rotates, the magnetic poles of the rotor pass by the conductive wire 50 embedded in the flexible circuit 14. The magnetic poles of the rotor induce an electrical current in the conducting wire 50, thus creating a plurality of electromagnetic fields. The magnetic fields induce a current perpendicular to the magnetic field, which is parallel to the conductive wire of the flexible quadrature circuit 14. The polarity of the rotor magnet seen by each stator tooth 22 alternates between north and south in a manner proportional to rotor rotation. The position of the rotor may then be calculated based on the induced alternating current within the flexible quadrature circuit 14. The electronic circuitry, which may be coupled to ends of the conducting wire 50 of the flexible circuit 14 to detect the position of the rotor, and the theory of operation of such detection circuitry is known in the art, and is described in U.S. Pat. No. 5,986,419, which patent is assigned to the assignee of the present invention, and is incorporated herein by reference in its entirety. Accordingly, the theory and operation of such detection circuitry is not described further.

Figure 2:
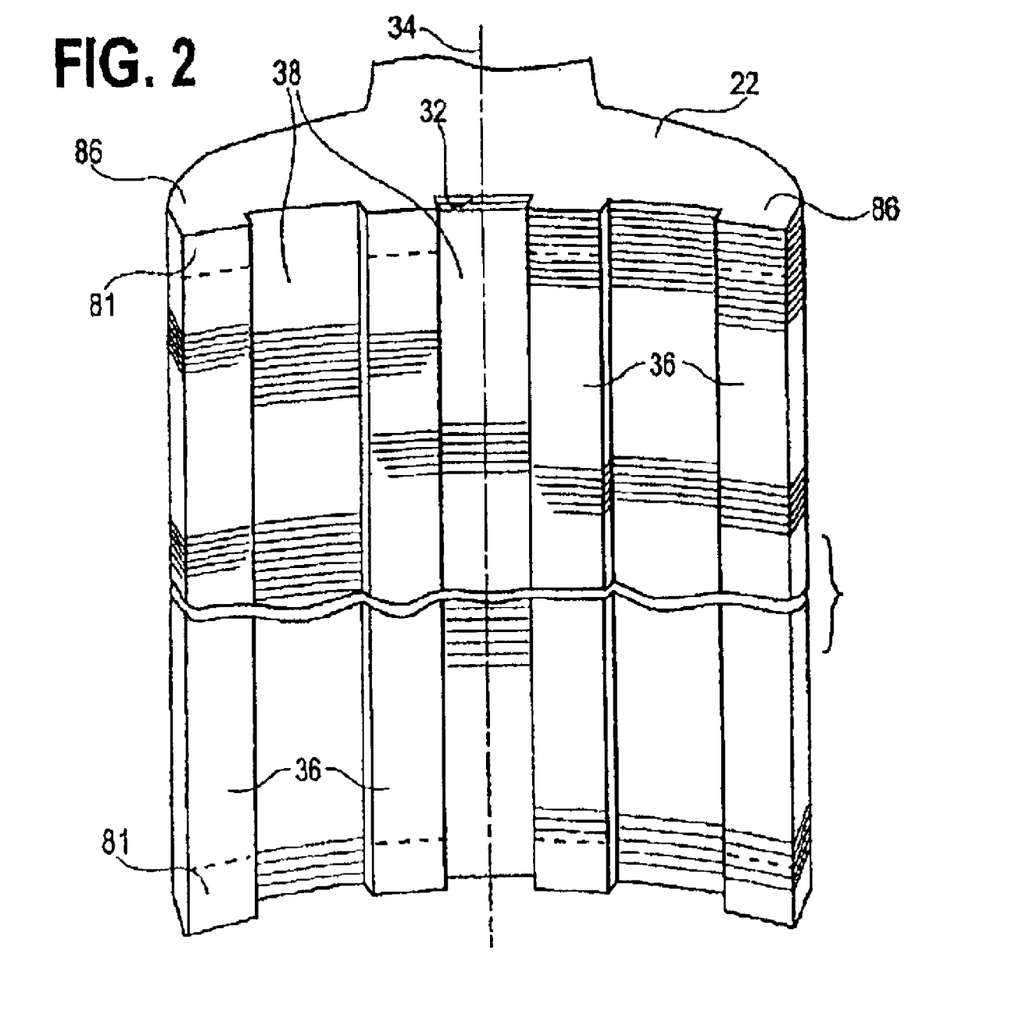
FIG. 2 is an enlarged perspective view of a specific embodiment of a stator tooth showing four elongated ribs and a center channel.

Still referring to FIGS. 2, 3A, and 3B, as described above, the flexible circuit 14 is a thin flexible sheet of plastic-like material that may be smoothly bent or curved so as to conform to the contour of the inner circumferential portion 18 of the stator core 12, as particularly shown in FIG. 3B. Preferably, the substrate 44 has a width sufficient to permit the substrate to cover each of the twelve stator teeth 22 such that the first and second ends 54 and 56 of the substrate are in relatively close proximity, but do not overlap, when the flexible circuit is curled or curved to fit within the stator core 12.

The flexible circuit 14 may include a plurality of vertical slots or cutouts 60 formed within a portion of the height of the flexible circuit. Preferably, the slots 60 extend for most of a height 62 of the flexible circuit 14. Of course, the slots 60 do not, and cannot, extend through the entire height 62 of the flexible circuit 14, otherwise the flexible circuit would be cut apart. The slots 60 define support columns or bars 64 disposed on either side of the slots, where the material has not been removed. The support columns 64 are formed of the thickness of the flexible circuit 14, and thus may be thought of as "two-dimensional" support columns because the flexible circuit is relatively thin. The slots 60 and the support columns 64 are rectangular in shape and preferably spaced parallel to each other and are parallel to the longitudinal axis 34 of the stator 12.

Note that the ribs 36 and the slots 60 need not necessarily be elongated or continuous along the entire height 62 of the stator tooth. For example, in an alternate embodiment, the ribs 36 may be in the form of a plurality of vertically aligned bosses or raised projections placed along a portion of the height of the stator tooth. In that case, the slots or cutouts in the flexible circuit would be in the form of a plurality of corresponding apertures. That is, each boss or raised projection would fit into the correspondingly shaped aperture in the flexible circuit. The wire conductor would be similarly routed vertically between the apertures so as to align with channel.

In the illustrated embodiment, the slots 60 are positioned in a generally parallel spaced relationship to each other and correspond to the ribs 36 that project from the surface 38 of the stator tooth 22. Note that for purposes of illustration only, the stator tooth of FIG. 2 is not drawn to scale and does not necessarily match the scale of the flexible circuit 14 of FIG. 3A. When the flexible circuit 14 is bent or curved to fit within the inner circumferential portion 18 of the stator core 12, each rib 36 projects through and is retained by the corresponding slot 60. Although the flexible circuit 14 is bendable, it retains a degree of stiffness such that a slight frictional fit between the slot 60 and the rib 36 is formed. This, in part, helps retain the flexible circuit 14 within the stator core 12. Additionally, the natural tendency for the flexible circuit 14 to "uncurl" and assume a flat shape assists in maintaining the flexible circuit within the stator core 12 and flush against the arcuate surface 38 of the stator teeth 22. Further, the flexible circuit 14 may be spot-glued to the surface 38 of the stator tooth 22 using a suitable chemical adhesive.

In the specific embodiment of FIG. 3A, the flexible circuit 14 may have forty-eight slots 60 along its full width 70. This corresponds to the forty-eight ribs of the stator teeth 22, where each of the twelve stator teeth have four ribs 36. For purposes of clarity, not all of the forty-eight slots 60 are shown in FIG. 3A. However, any suitable number of slots 60 may be formed within the flexible circuit 14 without departing from the scope of the present invention as long as each rib 36 is received into a slot or is not blocked by a solid portion of the substrate 44. Because there are forty-eight slots 60, there are forty-nine support columns 64, including the end columns. Alternatively, there may be more slots 60 than ribs 36, in which case, only certain slots would receive the rib. Also, the slots 60 may be wider so as to accommodate two or more ribs within a single slot.

As shown in FIGS. 3A–3B by dashed lines, the embedded conducting wire 50 travels through the flexible circuit 14 along selected support columns 60. According to one specific embodiment, the conducting wire 50 may travel through every fourth support column 60. This is because there are four ribs 36 in each stator tooth 22 and the support column 60 containing the embedded conducting wire 50 aligns with the center channel 32 (FIG. 2). As described above, the conducting wire 50 is embedded in a "square-wave" type configuration. Because the conducting wire 50 is embedded in the spaced apart support columns 64, it must necessarily run along a portion of the width 70 of the flexible circuit 14, namely, along top 72 and bottom 74 lateral edges.

In this way, when the flexible circuit 14 may be installed within the stator core 12 such that the support columns 64 having the embedded conducting wire 50 are aligned with the channel 32 (FIG. 2) of each stator tooth. The depth of the channel 32 of each stator tooth 22 may be very slight, so long as it is sufficient to accommodate a slight "bulge" 80 (FIG. 4) in the support column 64 caused by the embedded conducting wire 50 running through that support column 64. This prevents the support column 64 of the flexible circuit 14 from bulging inwardly toward the center. This further insures that the flexible circuit 14 will not be nicked by or interfere with the spinning rotor. Alternatively, the substrate 44 may be sufficiently thick so that the embedded conducting wire 50 causes no bulge in the flexible circuit. In such a situation, the support column 64 would not be received into the channel 32 (FIG. 2), but rather, would be disposed proximal to the channel 32.

Figure 4:
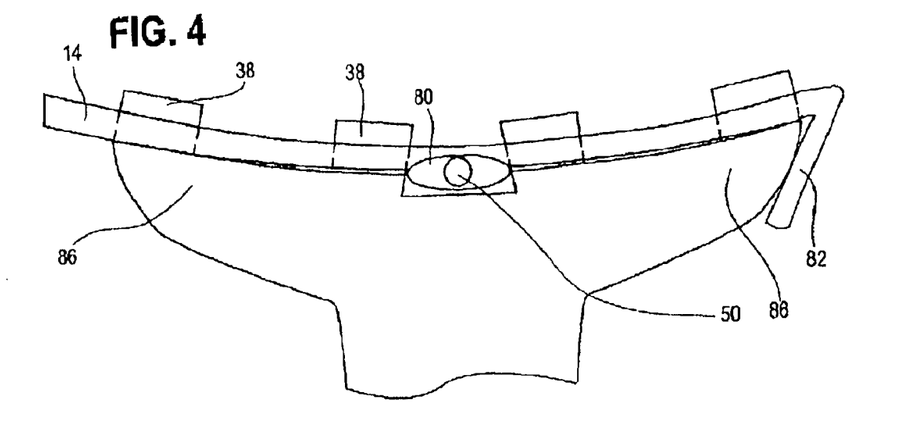
FIG. 4 is an enlarged end view of the stator pole of FIG. 1 showing a conductive wire received proximal the channel of the stator tooth.

Note that the bulge 80 is not shown to scale in FIG. 4 (nor in FIG. 7), but rather, is shown exaggerated for purposes of illustration only. Additionally, the position of the wire and the diameter of the wire within the thickness of the flexible circuit 14 is not shown to scale in the drawings, for purposes of illustration only.

Referring now to FIGS. 2, and 3A–3B, the height 62 of the flexible circuit 14 may be equal to the height of the stator tooth 22. In this case, to secure the flexible circuit 14 in a flush manner against the arcuate surface 38 of the stator tooth 22, the elongated ribs 36 may be shorter than the full height of the stator tooth. In particular, a margin area 81 may exist along top and bottom portions of the stator tooth 22, as shown by dashed lines in the ribs 36 of FIG. 2. Alternatively, the ribs 44 may extend for the full height of the stator tooth 22 and the height of the flexible circuit 14 may be slightly greater than the height of the stator tooth so that the top 72 and bottom 74 lateral edges of the flexible circuit 14 extend above and below the ribs 36.

The first and second ends 54 and 56 of the flexible circuit 14 may terminate in a flap or tab portion 82, which may be defined by a permanent bend or folded portion in the flexible circuit. As shown in FIG. 1, the tab portion 82 of the first and second ends 54, 56 are folded over and grip outwardly extending ears 86 of the stator tooth 22 so as to additionally secure the ends of the flexible circuit 14. The tabs 82 preferably extend along the entire height 62 of the flexible circuit 14, but need not necessarily do so. Alternatively, the tab 82 portions may be separate from the flexible circuit 14 and may be attached thereto by chemical adhesive, ultrasonic weld, heat weld, or other suitable method known in the art.

Figure 5:
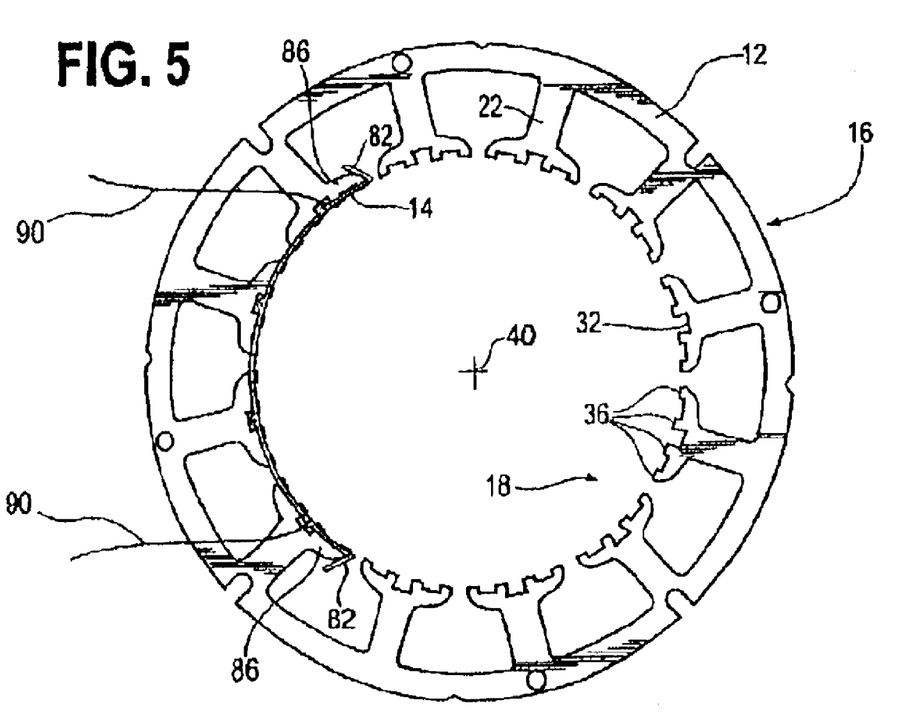
FIG. 5 is an end elevational view of an alternate embodiment of the stator core of FIG. 1.
Figure 6:
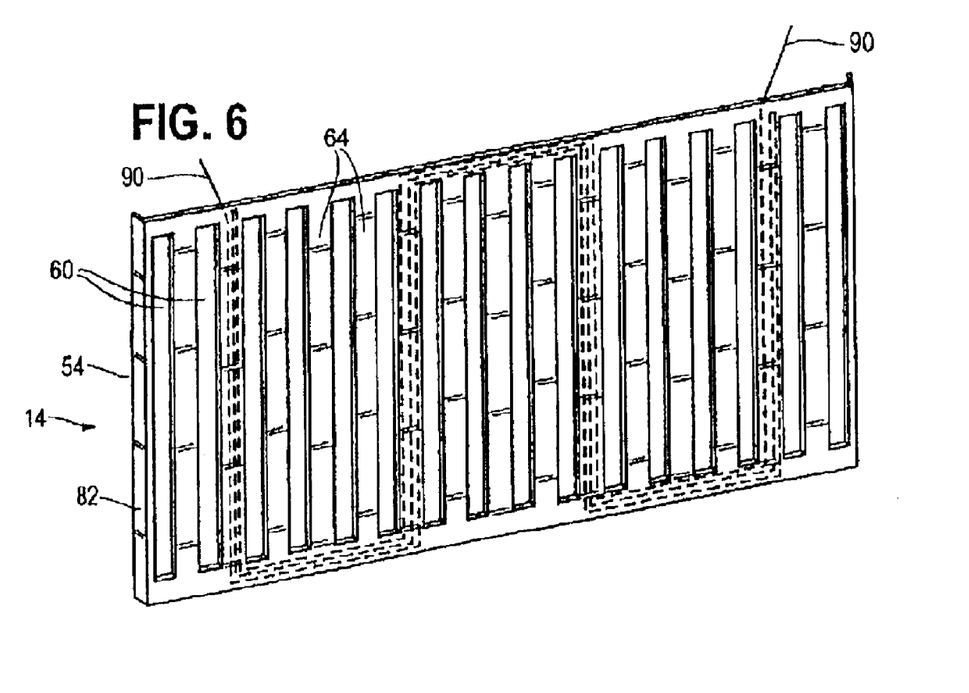
FIG. 6 is a perspective view of an alternate embodiment of a flexible quadrature coil.
Figure 7:
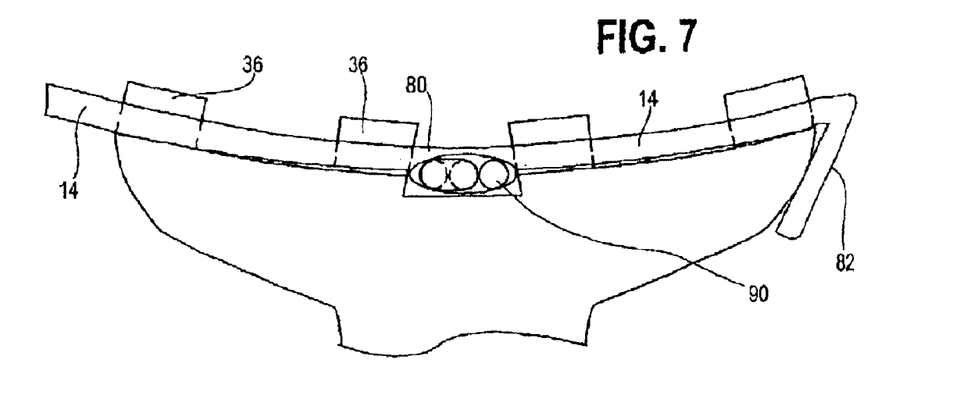
FIG. 7 is an enlarged end view of a stator pole showing a flexible quadrature coil having three conducting wires.

Referring now to FIGS. 5–7, an alternate embodiment is shown where like reference numbers will be used to designate like structures throughout the various views. In this specific embodiment, the flexible circuit 14 may engage less than all of the stator teeth 22. In particular, FIG. 5 shows the flexible circuit 14 spanning only four of the twelve stator teeth 22. Again, as shown in FIG. 5, the tabs or flaps 82 of the flexible circuit 14 engage the ears 86 of distantly spaced stator teeth 22 to assist in retaining the flexible circuit in place. Because less material is used, that is, a shorter section of the substrate 44 is used, the manufacturing cost is reduced. The flexible circuit 14 can be configured to engage any desirable number of stator teeth 22 without departing from the scope of the invention.

FIGS. 6 and 7 show multiple turns of the conducting wire 90 embedded in the flexible circuit 14. When a shorter width of substrate 44 is used, the induced voltage caused by the rotor magnets is reduced. To provide an induced voltage of sufficient amplitude, multiple turns of the conducting wire 90 are embedded in the flexible circuit 14. The multiple turns of the wire 90 increase the amplitude of the signal delivered by the flexible circuit 14. Each of the multiple turns of the conducting wire 90 are insulated or separated from the other turns of wire. This may be achieved by use of insulated wire, or by strategic placement and separation of the wires as they are embedded in the substrate 44. Any suitable number of turns of the conducting wire 90 may be embedded in the flexible circuit 14 to provide an appropriate output voltage level without departing from the scope of the present invention. Of course, the bulge 80 caused by the multiple turns of the wire may be greater than the bulge caused by a single turn of the conducting wire if the same gauge wire is used.

In one embodiment, the coils of the conducting wire 50 may be shown as "changing direction" or following a U-shaped path at opposite ends. This pattern permits the conducting wire 90 to exit the substrate 44 without overlap.

Alternately, as shown in FIG. 6, the conducting wire, while still following the overall serpentine pattern, may nonetheless follow the perimeter of the previous coil so as to form a "spiral" while maintaining the overall serpentine pattern. In this configuration, the conducting wire 50 would cross over itself upon exiting the substrate 44 at one end.

From the foregoing it will be understood that modifications and variations can be effectuated without departing from the true spirit and scope of the novel concepts of the present invention. No limitation with respect to the specific embodiments illustrated is intended or should be inferred. The disclosure is intended to cover by the appended claims all such modifications as fall within the scope of the claims when the claims are properly interpreted.

What is claimed is:

1. A flexible quadrature coil circuit for use in an electronically commutated dynamoelectric machine for sensing an angular rotational position of a rotor relative to a stator, the stator having a plurality of stator teeth, each stator tooth having an inwardly facing arcuate surface with at least one raised projection and a channel disposed along a vertical axis of the tooth, the flexible circuit comprising:
 a flexible electrically nonconductive substrate;
 a plurality of vertically aligned apertures formed in the substrate, the apertures configured to receive the at least one corresponding raised projection of the stator tooth so as to releasably secure the substrate to the arcuate surface of the stator teeth;
 at least one continuous electrical conductor embedded in the substrate in a serpentine pattern, the continuous conductor forming a plurality of spaced apart conductor portions disposed between the vertically aligned apertures; and
 the conductor portions being vertically aligned with and received into the channel of the stator tooth when the flexible substrate is secured to the arcuate surface of a selected stator tooth.

2. A flexible quadrature coil circuit for use in an electronically commutated dynamoelectric machine for sensing an angular rotational position of a rotor relative to a stator, the stator having a plurality of stator teeth, each stator tooth having an inwardly facing arcuate surface with at least one elongated rib and a channel disposed along a vertical axis of the tooth, the circuit comprising:
 a flexible electrically nonconductive substrate;
 at least one slot formed in the substrate, the at least one slot configured to receive the at least one corresponding rib so as to releasably secure the substrate to the arcuate surface of the stator tooth;
 at least one continuous electrical conductor embedded in the substrate in a serpentine pattern, the continuous conductor forming a plurality of spaced apart conductor portions disposed between selected slots; and
 the conductor portions being vertically aligned with and received into the channel of the stator tooth when the flexible substrate is secured to the arcuate surface of selected stator teeth.

3. The flexible circuit as defined in claim 2 wherein said substrate includes first and second folded tab portions formed at opposite lateral sides of the substrate, the tab portions configured to releasably grip opposite lateral edges of the stator tooth.

4. The flexible circuit as defined in claim 2 wherein the substrate is disposed against all of the stator teeth of the rotor.

5. The flexible circuit as defined in claim 2 wherein the substrate is disposed against less than all of the stator teeth of the rotor.

6. The flexible circuit as defined in claim 2 wherein the rib forms an interference fit when received within the corresponding slot.

7. The flexible circuit as defined in claim 2 wherein the substrate includes a number of said slots equal to a number of said ribs on the stator teeth.

8. The flexible circuit as defined in claim 2 wherein said substrate is formed of a flexible plastic material.

9. The flexible circuit as defined in claim 2 wherein said substrate is formed of at least two laminated layers of nonconductive plastic material.

10. The flexible circuit as defined in claim 2 wherein the electrical conductor in disposed between two laminated layers.

11. The flexible circuit as defined in claim 2 wherein a plurality of turns of the electrical conductor are embedded in the substrate, each turn of the electrical conductor being electrically insulated from the other turns of the electrical conductor.

12. The flexible circuit as defined in claim 2 wherein the electrical conductor is disposed in the substrate in a square-wave pattern.

13. The flexible circuit as defined in claim 2 wherein the electrical conductor is disposed in the substrate in a serpentine pattern.

14. A flexible quadrature coil circuit for use in an electronically commutated dynamoelectric machine for sensing an angular rotational position of a rotor relative to a stator, the stator having a plurality of stator teeth, each stator tooth having an inwardly facing arcuate surface with at least one elongated rib and a channel disposed along a vertical axis of the tooth, the circuit comprising:
 a flexible electrically nonconductive substrate;
 means for receiving the at least one corresponding rib so as to releasably secure the substrate to the arcuate surface of the stator tooth;
 at least one continuous electrical conductor embedded in the substrate in a serpentine pattern, the continuous conductor forming a plurality of spaced apart conductor portions; and
 the conductor portions being vertically aligned with and received into the channel of the stator tooth when the flexible substrate is secured to the arcuate surface of selected stator teeth.

* * * * *